United States Patent [19]

Hauschild

[11] Patent Number: 5,619,819

[45] Date of Patent: *Apr. 15, 1997

[54] WRAP AROUND CARRYING CASE WITH ACCESSORIES

[76] Inventor: Alan D. Hauschild, 24908 W. Fox Trail, Lake Villa, Ill. 60046

[*] Notice: The term of this patent shall not extend beyond the expiration date of Pat. No. 5,488,799.

[21] Appl. No.: 510,187

[22] Filed: Aug. 2, 1995

Related U.S. Application Data

[63] Continuation-in-part of Ser. No. 239,941, May 9, 1994, Pat. No. 5,488,799, which is a continuation of Ser. No. 121,263, Sep. 13, 1993, abandoned.

[51] Int. Cl.⁶ .................................................. A01K 97/08
[52] U.S. Cl. ............................... 43/26; 224/922; 224/913
[58] Field of Search ............................ 43/26, 54.1, 21.2; 224/253, 922, 224, 226, 913; 42/96

[56] References Cited

U.S. PATENT DOCUMENTS 2,817,472  12/1957  Parkhurst ................................ 224/922
5,327,669  7/1994  Lannan et al. ............................... 43/26

FOREIGN PATENT DOCUMENTS

1419803  10/1965  France ......................................... 43/26

*Primary Examiner*—Kurt Rowan
*Attorney, Agent, or Firm*—Ladas & Parry

[57] ABSTRACT

An elongated recreational device holder for holding a fishing rod, shotgun or other elongated device and its associated accessories is disclosed. The holder consists of a carrier having a number of storage compartments and attachment rings. The carrier is padded and water-resistant to protect a fishing rod, shotgun and other devices and accessories placed therein. The carrier is length adjustable to snugly carry any elongated device of any length. Once the elongated device is removed form the carrier, the carrier wraps around the waist of the user such that the user is free to move about, while at the same time having all desired accessories readily at hand.

20 Claims, 6 Drawing Sheets

WRAP AROUND CARRYING CASE WITH ACCESSORIES

This application is a continuation-in-part of U.S. application Ser. No. 08/239,941 filed May 9, 1994, now U.S. Pat. No. 5,488,799 which is a continuation of U.S. application Ser. No. 08/121,263 filed Sep. 13, 1993, now abandoned.

The present invention relates generally to storage and carrying means for an elongated recreational device; and more specifically, the invention relates to portable carrying means for flying fishing rods, a rifle or shotgun, or other elongated recreational device, wherein the portable carrying means is convertible to a belt or sling which may accommodate recreational device accessories.

The sport of fishing requires the use of a large number of items such as rods, reels, nets, lures, stringers, etc. A person wishing to fish needs to have all of these items and accessories on hand or readily nearby. Because of the large number of many different accessories, it is extremely difficult to carry all of these accessories at once. This presents a large problem for a person fishing along a shoreline who would like to walk along the shoreline or wade into the water while fishing. This person would have to leave the fishing gear behind or slowly and distractingly move the gear accordingly. Likewise hunting and sports involving the use of guns require accessories such as ammunition, attractants or bird calls, knives, etc.

In the past, the common method for carrying a number of fishing or hunting accessories has been through the use of a vest having a number of pockets. However, these vests tend to restrict complete freedom of movement and are uncomfortable, particularly in warm weather. In cold weather the vest may be covered by an outer garment and not be readily accessible. Additionally, such vests are very limited in storage capacity and cannot hold a fishing rod, gun or rifle or other accessories which must be carried separately at the risk of being lost, dropped or damaged.

To store or transport a fishing rod, a rod tube is most commonly used. A tube is a long cylindrical rigid tube with a cover, in which a rod is placed. However, rod tubes are bulky and cumbersome and must either be left ashore while wading or must be left in a vehicle, in which case only the rod is carried to a fishing location, thereby exposing the rod to damage from snags on trees and underbrush.

Numerous other attempts have been made to provide a means for carrying fishing accessories. For example, U.S. Pat. No. 4,957,231 issued to Kalisher, discloses a tackle box belt. This belt however has no means for protecting and transporting a rod. Further, the pockets are not padded and are relatively small to hold lures and such and are incapable of holding a large lure box or other large items.

U.S. Pat. No. 4,628,628 issued to Burgin, et al, discloses a fishing equipment holder having an elongated cylindrical body having notched brackets for holding fishing equipment. This holder however does not wrap around a person's waist, exposes all the gear in the notched brackets, and does not contain accessible compartments for lures and tackle while in use.

U.S. Pat. No. 4,529,112, issued to Miller, discloses a carrier for fishing rods and tackle comprising a tackle box and a rod holder attached to a carrier plate. This carrier however does not wrap around the waist and exposes the fishing rods, leaving them unprotected while in transport. Further, this carrier is extremely complex and costly to manufacture.

U.S. Pat. No. 3,678,611, issued to Files, discloses a cylindrical floating fishing tackle carrier. This carrier however does not wrap around the waist, and a user must also submerge themselves in water for the floating carrier to be useful. The floating carrier proves to be cumbersome, bulky and if there are waves, the carrier can be very awkward.

U.S. Pat. No. 2,823,971, issued to Hoyt, discloses a tackle box. This tackle box however does not wrap around the waist, but is worn on a person's back, thereby making accessibility difficult and inconvenient. A rod can be tied to a side of the tackle box, but this leaves the rod unprotected and removal of the rod time consuming.

U.S. Pat. No. 2,817,472 issued to Parkhurst, discloses a belt with compartments for use by fishermen. However, their belt has no means of carrying or transporting and is not suitable for all waist sizes, i.e., is not readily adjustable. Further, fishing items are placed into cylinders carried on the belt, thereby restricting the number and size of items that can be carried. There are sleeves in the belt for a rod but the rod still remains exposed and vulnerable to damage.

French Patent No. 1,419,803 relates to a carrier for a fishing rod which is convertible to a belt. In this patent the carrier is doubled over upon itself and an elongated carrying strap for the carrier is disconnected from one end of the carrier and extended around the waist as a belt. This arrangement requires that the carrying strap or handle for the carrier be rather long and that one end of the carrying strap be secured at approximately the mid-point of the carrier and the other end be connected to an end of the carrier.

The present invention solves the problems, disadvantages and shortcomings of the prior art by providing a portable and adjustable wrap around fishing rod holder with accessories, which completely protects a fishing rod and gear and allows a user to completely maintain freedom of movement during fishing, while at the same time being readily accessible to all compartments. Also, the invention is simple in construction and use, thereby saving the user time and money.

Similar disadvantages associated with storing, carrying and transporting other elongated recreational devices such as rifles or guns and their associated accessories occur in other recreational areas as well, such as hunting. The present invention is useful in these applications as well.

BRIEF SUMMARY OF THE INVENTION

One embodiment of the present invention comprises a portable carrier for a fishing rod and other items. Unlike fishing vests which restrict complete freedom of movement and are uncomfortable, the present invention turns into a belt once the rod is removed, also eliminating the need for a rod tube. It is adaptable to be worn by persons of different weight and height. The invention preferably can fit waist sizes from 29" to 54". The invention further folds into a compact package when not in use.

The invention provides durable protection and improved means for storage and transportation of fishing accessories and rods of any length. There is a hidden pocket behind a large main pocket, a fleece for flies and hooks, a knife pocket, and at least one moveable pocket (preferably two). Additional moveable pockets may be added as needed. The overall shape and pockets are formed to hold their shape. They are not envelope style and collapsible as are pockets on a vest.

Another embodiment of the present invention comprises a portable carrier for a rifle or shotgun and it is foreseen that the present invention is applicable to any elongated recreational device.

Accordingly, it is the principle object of the present invention to provide means for storing and transporting an elongated recreational device and accessories.

It is a further object of the invention to provide a carrier that can be worn as a belt about the waist or as a sling about the chest.

It is also an object of the invention to allow a sportsman to easily and safely transport and access selective quantities of recreational gear.

It is an additional object of the invention to provide a padded elongated recreational device holder that converts into an adjustable wrap around belt.

It is another object of the invention to provide a top-of-the-line, attractive, extremely durable, padded, and water-resistant carrier for recreational device accessories.

It is yet another object of the invention to provide a carrying case for securely carrying any length recreational device, regardless if the device comprises multiple pieces (2, 3, or 4), by allowing the case to be adjustable in length by folding over an end of the case to prevent the device from sliding therein.

Numerous other advantages and features of the invention will become apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT OF THE PRESENT INVENTION

While the invention is susceptible of embodiment in many different forms, there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1–9 illustrate one embodiment 10 of the present invention comprising fishing rod and accessories holder or carrier 20. Carrier 20 is two durable and water-resistant, elongated, belt-like pieces of material preferably made of ¼ inch foam lined TRECO (R.T.M.) and CONDURA (R.T.M.). Carrier 20 has a substantially linear top edge 22, a stepped bottom edge 24 having an upper step edge 24a and a lower step edge 24b, an elongated side edge 26, and a shorter side edge 28, as well as a front panel 30 and a back panel 32. The front panel 30 is fastened to the back panel 32, a portion of said edges by stitching with zipper means 34 extending along the side edge 26 and the adjacent portion of the top edge 22 and the lower step edge 24b thereby forming an enclosure or rod-holding pocket.

Front panel 30 contains an integral pocket 40, an integral fleece 50, and an integral knife sheath 60. Carrier 20 further contains at least one (preferably two) removable and adjustable pocket 70 which is wrapped around top edge 22, front panel 30, lower step edge 24a, and back panel 32.

Top edge 22 has a handle 80 for carrying carrier 20 when not wrapped around the waist. Bottom edge 24 has a "D"-ring 82 for attachment of an accessory such as a fish stringer. Bottom edge 24 also has a clip ring 84 for attachment of an accessory such as a fish net 86.

Front panel 30 and back panel 32 have fastening means 90 for adjustable fastening invention 10 around the waist of a user. Fastening means 90 is preferably VELCRO (RTM) hook and loop type fasteners.

Figure 1:
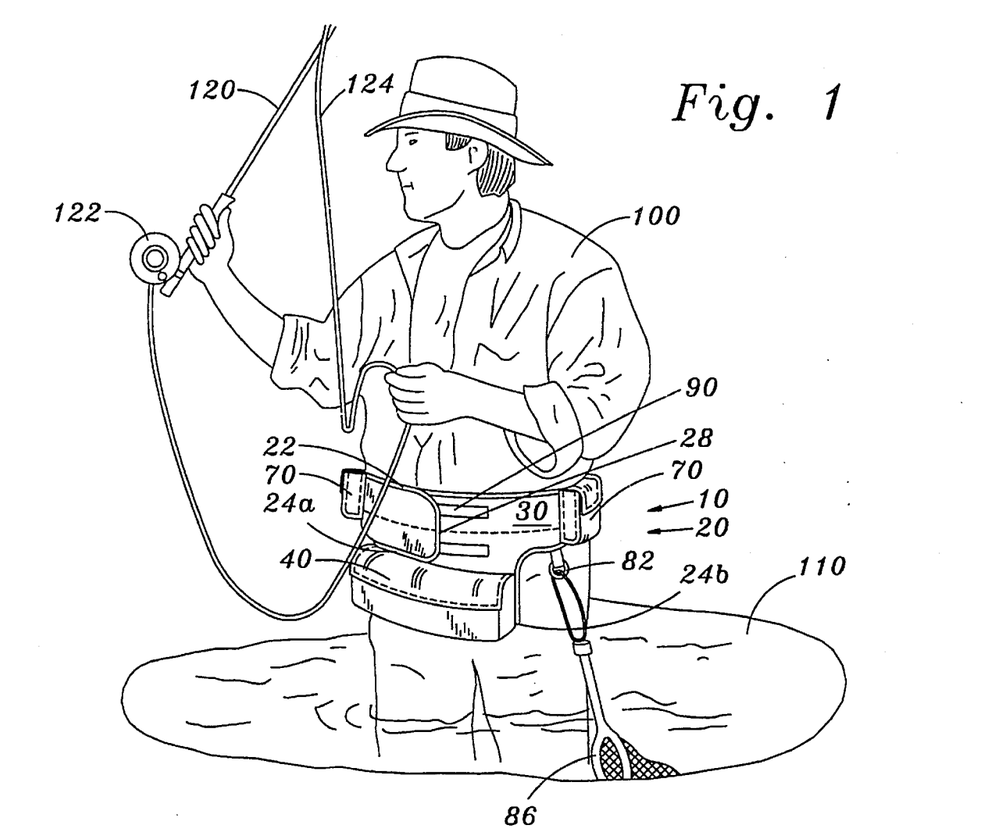
FIG. 1 is a perspective view of an embodiment of the present invention in use around the waist of a fisherman.

As can been seen in FIG. 1, carrier 20 wraps around the waist of a user or fisherman 100 when the carrier is in a fishing position, as illustrated. Fastening material 90 on back panel 32 (not shown) coacts with complimentary fastening material 90 on front panel 30 to securely and snugly wrap invention 10 around the waist of fisherman 100 and hold it thereto. The fisherman is now free to fish without any restrictions in movement. The fisherman can walk along a shoreline or wander into the water 110 and still have all the needed accessories along with and readily accessible. By holding fishing rod 120 having reel 122, line 124 and lure (not shown) in one hand, the other hand is free to access any compartment or location on carrier 20 as desired.

Figures 2, 3:
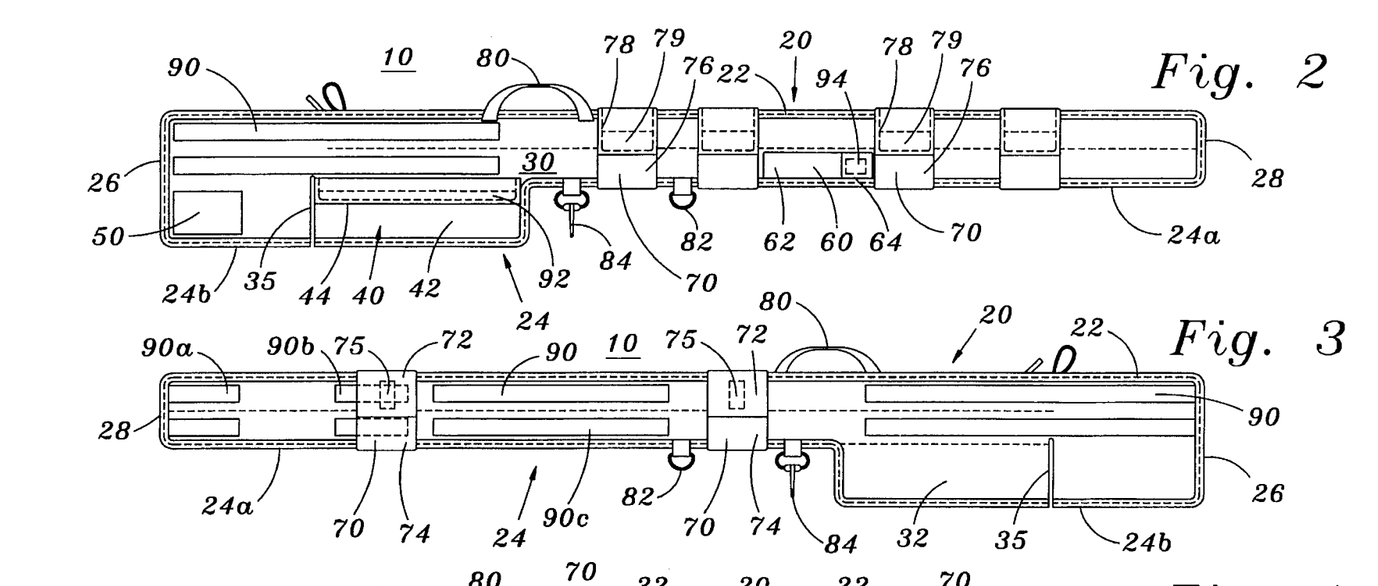
FIG. 2 is a front view of the same embodiment of the present invention in a rod transporting position.
FIG. 3 is a back view thereof in a rod transporting position.

FIG. 2 is a front view of invention 10 in its rod holding or transporting position. Front panel 30 of carrier 20 can be seen having top edge 22, stepped bottom edge 24 including lower step edge 24a and upper step edge 24b, elongated side edge 26 and short side edge 28.

Pocket 40 is shown on front panel 30. Pocket 40 comprises a front wall 42 and a lid 44 which extends over front wall 42 and is removably fastened thereto by complimentary fastening means 92, preferably hook and loop type fasteners.

Similarly, knife sheath 60 is shown on front panel 30 and comprises a front wall 62 and a lid 64 which extends over front wall 62 and is removably fastened thereto by complimentary fastening means 94, preferably hook and loop type fasteners. Knife sheath 60 is horizontally disposed on front panel 30, however it should be understood that sheath 60 could also be vertically disposed or disposed at an angle.

Removable and adjustable pockets 70 are wrapped around carrier 20 at top edge 22, front panel 30, upper step edge 24a, and back panel 32 (not shown). The ends 72, 74 of pockets 70 are removably fastened over back panel 32 (as seen in FIG. 3). Pockets 70 are selectively, adjustably positioned around carrier 20 along the length of upper step edge 24a illustrated by the arrows in FIG. 2 and by the phantom line drawings of pockets 70. Pockets 70 include a front wall 76 and a lid 78 which extends over front wall 76 and is removably fastened thereto by complimentary fastening means 79, preferably VELCRO (R.T.M.) type fastening material. Hook and loop type or hook and eyelet type fasteners could also be used.

Handle 80 is shown attached to top edge 22 of carrier 20. By holding handle 80, a user can easily and safely carry a fishing rod and other fishing accessories. Because front panel 30, back panel 32 and all pockets of carrier 20 are padded, should the carrier bump into an object, the fishing rod and accessories in the carrier 20 are shielded from harm.

"D"-ring 82 and clip ring 84 are shown suitably attached to lower step edge 24a. However, it should be understood that any number of "D"-rings and/or clip rings may be suitably attached in any location on carrier 20.

Front panel 30 has two parallel, spaced apart long strips of fastening material 90, preferably loop type VELCRO (RTM) running horizontally from elongated side edge 26 parallel to and in proximity of top edge 22. The two long strips are substantially equal to the length of lower step edge 24b. Carrier 20 is adjustable along the length of said two long strips by selectively positioning short edge 28 at any location therealong, after wrapping carrier 20 around the waist.

FIG. 2 further shows carrier 20 having a small opening or vertical slit 35 between pocket 40 and fleece 50. Slit 35 runs vertically from upper step edge 24b to the level of lower step edge 24a extended. Slit 35 facilitates the wrapping of carrier 20 around a waist and provides more comfort to a user.

FIG. 3 is a back view of the present invention 10 in its rod holding position. Back panel 32 of carrier 20 can be seen having top edge 22, stepped bottom edge 24 including lower step edge 24a and upper step edge 24b, elongated side edge 26 and short side edge 28.

Pockets 70 can be seen wrapped around carrier 20. Pocket ends 72 and 74 overlap and are removably connected by fastening means 75, preferably complimentary hook and loop type fasteners. Further, handle 80, "D"-ring 82 and clip ring 84 can be seen suitably attached to carrier 20. Slit 35 in carrier 20 is shown.

Figures 7, 8, 9:
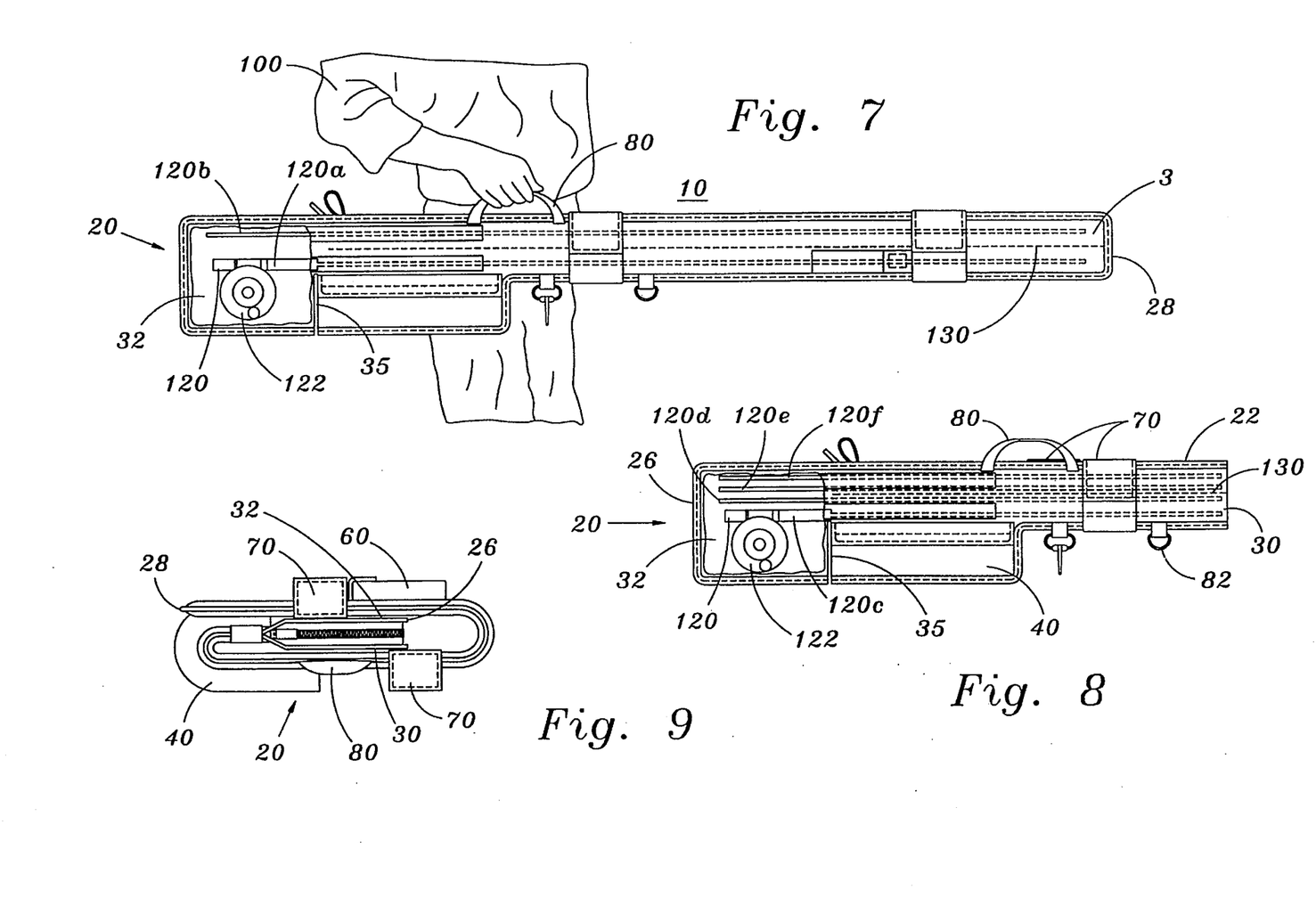
FIG. 7 is a partially broken away front view thereof in use transporting a rod.
FIG. 8 is a partially broken away front view thereof in use transporting a rod, in length adjusting position.
FIG. 9 is a top view of FIG. 8.

Back panel 32 has a plurality of short parallel, spaced apart strips of fastening material 90 running horizontally along substantially the entire length thereof, parallel to and in proximity of top edge 22. Fastening material 90 on back panel 32 is illustrated as two parallel rows of strips 90a, 90b, 90c, and 90d. Strips 90 a are preferably hook type VELCRO (RTM). Strips 90b, 90c and 90d are preferably loop type VELCRO (RTM). The two parallel strips 90a selectively and adjustably coact with the two long parallel strips of fastening material on front panel 30 when the carrier 20 is wrapped around the waist. Alternatively, the two parallel strips 90a selectively and adjustably coact with the two parallel strips 90b when the carrier 20 is adjusted in length to snugly carry rods which do not extend to short side edge 28 (as illustrated in FIGS. 8 and 9).

Figures 4, 5:
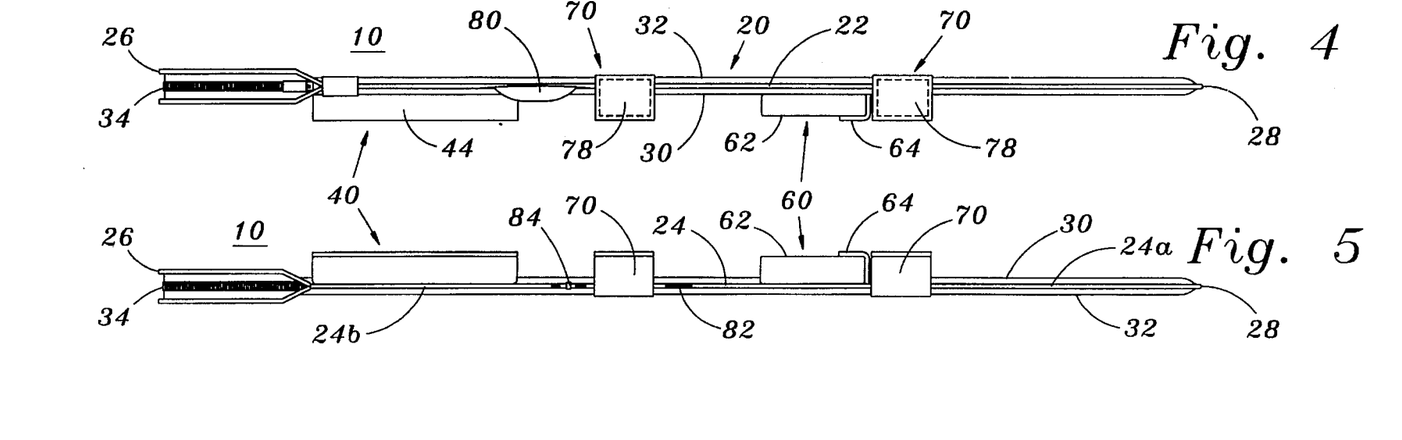
FIG. 4 is a top view thereof in a rod transporting position.
FIG. 5 is a bottom view thereof in a rod transporting position.

FIG. 4 is a top view of invention 10. Carrier 20 is shown having a top edge 22, an elongated side edge 26 and a short side edge 28, as well as a front panel 30 and a back panel 32. Zipper means 34 openably fastens front panel 30 to back panel 32, preferably at elongated side edge 26. The front panel 30 and back panel 32 are suitably fastened along the remaining portion of the edges of carrier 20 such as by stitching.

Integral pocket 40 and sheath 60 with cover or lid 44 and 64 respectively can be seen attached to front panel 30. Pockets 70 with lids 78 can be seen wrapped around carrier 20. Handle 80 is seen attached to top edge 22 of carrier 20.

FIG. 5 is a bottom view of invention 10. Carrier 20 is shown having bottom edge 24 with lower stepped edge 24a and upper stepped edge 24b, elongated side edge 26 and a short side edge 28, as well as a front panel 30 and a back panel 32. Zipper means 34 is shown openably fastening front panel 30 to back panel 32 at elongated side edge 26.

Integral pocket 40 and sheath 60 with lid 64 can be seen attached to front panel 30. Pockets 70 can be seen attached to front panel 30. Pockets 70 can be seen wrapped around carrier 20. "D"-ring 82 and clip ring 84 are attached to lower stepped edge 24a.

Figure 6:
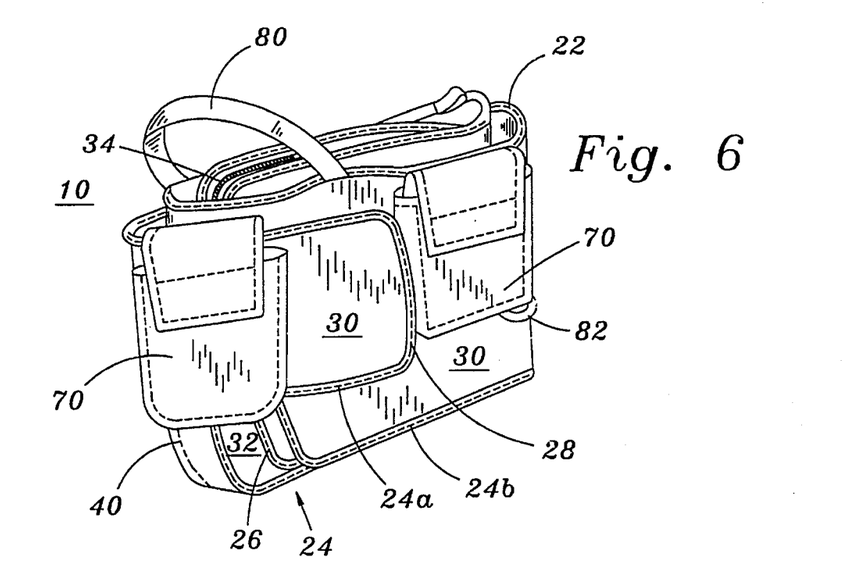
FIG. 6 is a perspective view thereof in a storage position.

FIG. 6 illustrates the carrier in its folded position for storage when not in use. Carrier 20 folds into a compact-sized package which is easily storable when not in use. Further, handle 80 and pockets 40, 60 and 70 remain accessible for easy transportation and storage of accessories.

To fold carrier 20 to its folded position, elongated side edge 26 is folded over about vertical slit 35. Short side edge 28 is then wrapped around the folded portion until the two parallel strips 90a on back panel 32 coact with the two parallel spaced apart long strips of fastening material 90 on front panel 30. Therefore, the entire carrier is fastened in a compact package having a handle and accessible pockets.

FIG. 7 is a partially broken away front view of the present invention 10 illustrating rod 120 and reel 122 inserted into carrier 20. As can be seen, rod 120 comprises two sections 120a and 120b. Rod section 120a has reel 122 attached thereto. Rod 120 and reel 122 rest securely and safely inside carrier 20. Fisherman 100 need only grasp handle 80 and carry invention 10 to a fishing location. Front panel 30 and back panel 32 are preferably stitched together along stitch line 130 from short side edge 28 to slit 35 so that rod section 120a and rod section 120b remain separated while in carrier 20. As can be seen, carrier 20 has enough space to carry a plurality of fishing rods and reels.

FIG. 8 is a partially broken away front view of the present invention 10 in use in a length adjusted position transporting rod 120 and reel 122. As can be seen, rod 120 is illustrated comprising four short sections, 120c, 120d, 120e, and 120f. Rod section 120c has reel 122 attached thereto. Rod 120 and reel 122 rest securely and safely inside carrier 20. As can be seen, short sections 120c, 120d, 120e, and 120f of rod 120 extend only to "D"-ring 82. In order to prevent the short sections from sliding around inside carrier 20, the present invention 10 is adjustable in carrying length. Short side edge 28 is folded over back panel 32 such that the four short strips 90a (FIG. 3) selectively and adjustably coact with the two strips 90b (FIG. 3). In this manner, carrier 20 can be adjusted to any length to accommodate any sized rod having any number of sections. Once adjusted, a fisherman need only grasp handle 80 and carry invention 10 to a fishing location. It is foreseen that handle 80 can be selectively and removably fastened by suitable fastening means along the length of top edge 22. Thus, handle 80 can be securely positioned in a desired or optimally balanced position when the carrier is adjusted in length.

FIG. 9 is a top view of the length adjusted carrier 20 of FIG. 8. As can be seen, short side edge 28 is folded over back panel 32 such that fasteners 90*a* and 90*b* (FIG. 3) coact. Carrier 20 is adjustable in this manner to any length by selectively positioning edge 28 at any location along back panel 32. All pockets remain accessible.

In use, a fishing pole 120 is inserted into carrier 20 and the zipper means 34 is closed. Carrier 20 is then adjusted to a desired length, if need be. Desired accessories may be inserted into the pockets. The user 100 then grasps handle 80 and carries the carrier 20 to a desired fishing location. The padded carrier 20 protects the fishing rod and accessories from being damaged while in transit. When the user 100 reaches the desired location, the rod 120 is removed and carrier 20 is wrapped around the waist of the user. Short side edge 28 is selectively positioned along fastening material 90*a* on front panel 30. Fastening material 90*a* on back panel 32 coacts with fastening material 90 on front panel 30 to securely and comfortably hold the carrier 20 around the waist of the user 100. The user is then free to wander around without restricted movement and fish, while at the same time having any desired fishing accessories readily at hand.

As described above, pockets 70 are selectably positioned on or removed from carrier 20 according to a user's preference or need. It is foreseen that other pocket options can be made in various shapes or sizes depending on personal preference of a user. For example, an attachable and adjustable pocket similar to pockets 70 could be made for insulated storage for cold items such as a lunch or beverages. Further pockets could be made to hold a large lure box or to store personal belongings such as glasses, a wallet, a camera, etc.

FIGS. 10–18 illustrate an alternate embodiment of the present invention 210 comprising an elongated firearm and accessories holder or carrier 220. Carrier 220 is two durable and water-resistant, elongated, belt-like pieces of material preferably made of ⅛" foam lined TRECO and CODURA. Carrier 220 has a substantially linear top edge 222, a stepped bottom edge 224 having lower step edge 224*a* and upper step edge 224*b*, an elongated side edge 226, and a short side edge 228, as well as a front panel 230 and a back panel 232. Front panel 230 is fastened to back panel 232 by zipper means 234 along said edges, thereby forming an enclosure or rod-holding pocket.

Front panel 230 contains an integral pocket 240. Carrier 220 further contains at least one (preferably two) removable and adjustable pocket 270 which is wrapped around top edge 222, front panel 230, lower step edge 224*a* and back panel 232. Top edge 222 has a handle 280 for carrying carrier 220 when not wrapped around the waist. Bottom edge 224 has two "D"-rings 282 for attachment of an accessory.

Front panel 230 and back panel 232 have fastening means 290 for adjustable fastening invention 210 around the waist of a user. Fastening means 290 is preferably VELCRO (RTM) hook and loop type fasteners.

Figure 10:
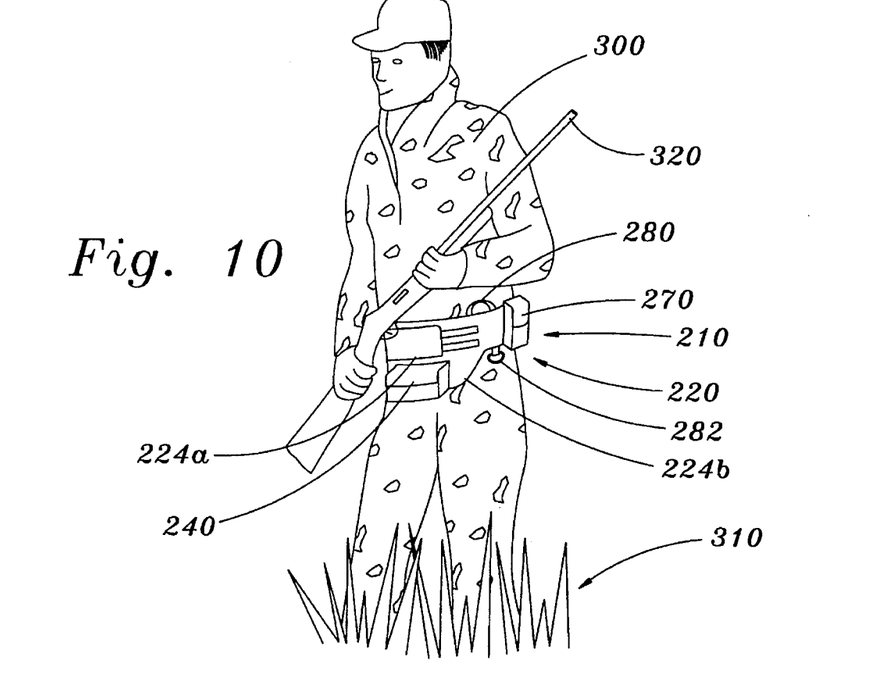
FIG. 10 is a perspective view of an alternate embodiment of the present invention in use around the waist of a hunter.

As can be seen in FIG. 10, carrier 220 wraps around the waist of a user or hunter 300 when the carrier is in a belt position, as illustrated. Fastening material 290 on back panel 232 (not shown) coacts with complimentary fastening material 290 on front panel 230 to securely and snugly wrap invention 210 around the waist of hunter 300 and hold it thereto. The hunter is now free to hunt without any restrictions in movement. The hunter can walk through field 310 and still have all the needed accessories along with and readily accessible. By holding gun 320 in one hand, the other hand is free to access any compartment or location on carrier 220 as desired. As can be seen, hunter is dressed in camouflage and carrier 220 is preferably camouflaged as well.

Figures 11, 12:
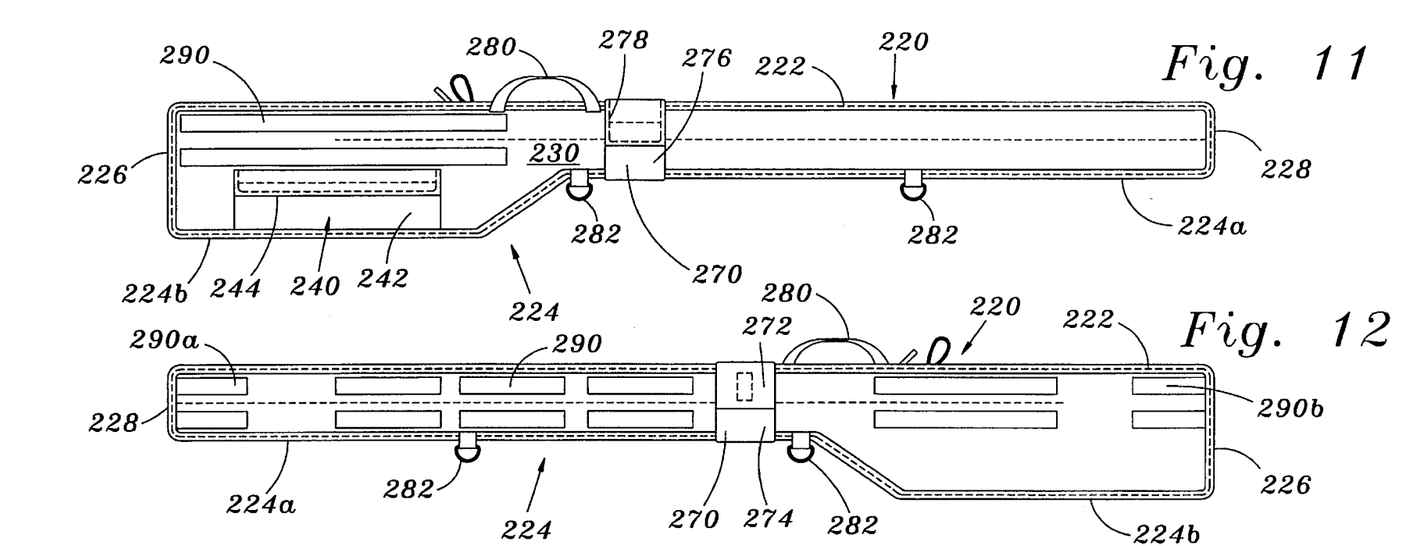
FIG. 11 is a front view of the alternate embodiment in a rifle or shotgun transporting position.
FIG. 12 is a back view of the alternate embodiment in a rifle or shotgun transporting position.

FIG. 11 is a front view of invention 210 in its gun holding or transporting position. Front panel 230 of carrier 220 can be seen having top edge 222, stepped bottom edge 224 including lower step edge 224*a* and upper step edge 224*b*, elongated side edge 226 and short side edge 228.

Pocket 240 is shown on front panel 230. Pocket 240 comprises a front wall 242 and a lid 244 which extends over front wall 242 and is removably fastened thereto by complimentary fastening means (not shown), preferably hook and loop type fasteners.

One removable and adjustable pocket 270 is illustrated in FIG. 11. Pocket 270 is wrapped around carrier 220 at top edge 222, front panel 230, lower step edge 224*e*, and back panel 232 (not shown). The ends 272, 274 of pockets 270 are removably fastened over back panel 232 (as seen in FIG. 12). Pocket 270 is selectively, adjustably positioned around carrier 220 along the length of lower step edge 224*a*. Pocket 270 includes a front wall 276 and a lid 278 which extends over front wall 276 and is removably fastened thereto by complimentary fastening means (not shown), preferably hook and loop type fasteners.

Handle 280 is shown attached to top edge 222 of carrier 220. By holding handle 280, a user can easily and safely carry an elongated gun and other hunting accessories. Because front panel 230, back panel 232 and all pockets of carrier 220 are padded, should the carrier bump into an object, the gun and accessories in the carrier 220 are shielded from harm.

"D"-ring 282 is shown suitably attached to lower step edge 224*a*. However, it should be understood that any number of "D"-rings or other attachment rings may be suitably attached in any location on carrier 220.

Front panel 230 has two parallel, spaced apart long strips of fastening material 290, preferably loop type VELCRO (RTM) running horizontally from elongated edge 226 parallel to and in proximity of top edge 222. The two long strips are substantially equal to the length of upper step edge 224*b*. Carrier 220 is adjustable along the length of said two long strips by selectively positioning short edge 228 at any location therealong, after wrapping carrier 220 around the waist.

FIG. 12 is a back view of the present invention 210 in its gun holding position. Back panel 232 of carrier 220 can be seen having top edge 222, stepped bottom edge 224 including lower step edge 224*a* and upper step edge 224*b*, elongated side edge 226 and short side edge 228.

Pocket 270 can be seen wrapped around carrier 220. Pocket ends 272 and 274 overlap and are removably connected by fastening means (not shown), preferably complimentary hook and loop type fasteners. Further, handle 280 and "D"-rings 282 can be seen suitably attached to carrier 220.

Figure 17:
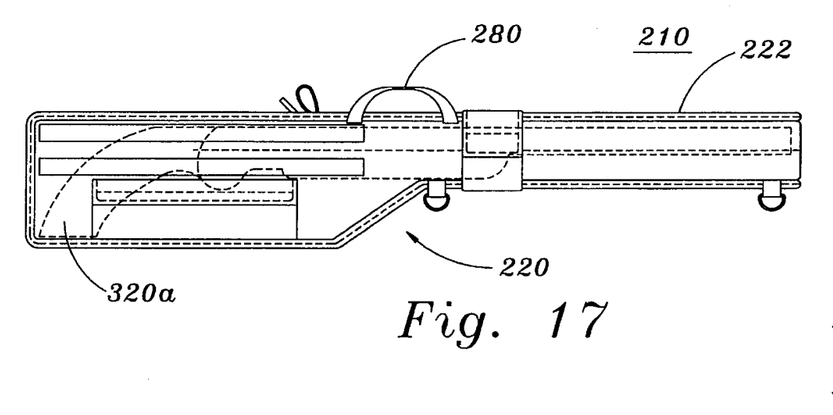
FIG. 17 is a partially broken away front view of the alternate embodiment in use transporting a rifle, in length adjusting position.
Figure 18:
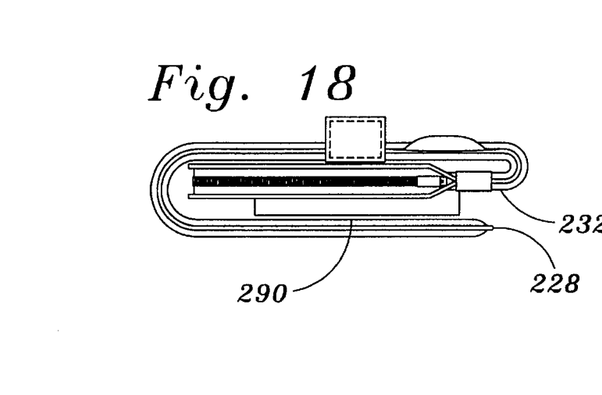
FIG. 18 is a top view of the alternate embodiment of FIG. 17.

Back panel 232 has a plurality of short parallel, spaced apart strips of fastening material 290 running horizontally along substantially the entire length thereof, parallel to and in proximity of top edge 222. Fastening material 290 on back panel 232 is illustrated as two parallel rows of strips 290a, 290b, 290c, and 290d. Strips 290a are preferably hook type VELCRO (RTM). Strips 290b, 290c, and 290d are preferably loop type VELCRO (RTM). The two parallel strips 290a selectively and adjustably coact with the two long parallel strips of fastening material on front panel 230 when the carrier 220 is wrapped around the waist. Alternatively, the two parallel strips 290a selectively and adjustably coact with the two parallel strips 290b when the carrier 220 is adjusted in length to snugly carry guns which do not extend to short side edge 228 (as illustrated in FIGS. 17 and 18).

Figure 13:
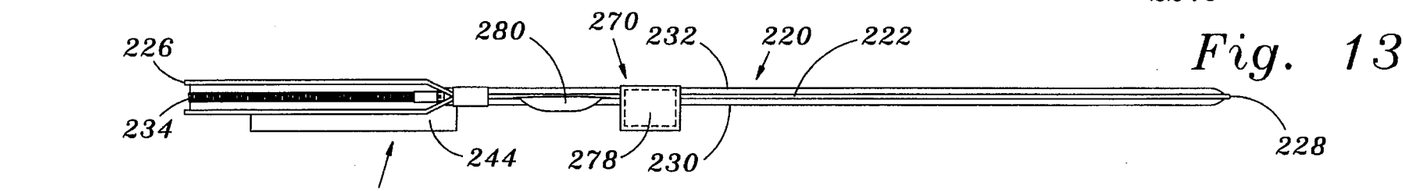
FIG. 13 is a top view of the alternate embodiment in a rifle or shotgun transporting position.

FIG. 13 is a top view of invention 210. Carrier 220 is shown having a top edge 222, an elongated side edge 226 and a short side edge 228, as well as a front panel 230 and a back panel 232. Zipper means 234 openably fastens front panel 230 to back panel 232, preferably at elongated side edge 226. The front panel 230 and back panel 232 are suitably fastened along with the remaining portion of the edges of carrier 220 such as by stitching.

Integral pocket 240 with cover or lid 244 can be seen attached to front panel 230. Pocket 270 with lid 278 can be seen wrapped around carrier 220. Handle 280 is seen attached to top edge 222 of carrier 220.

Figure 14:
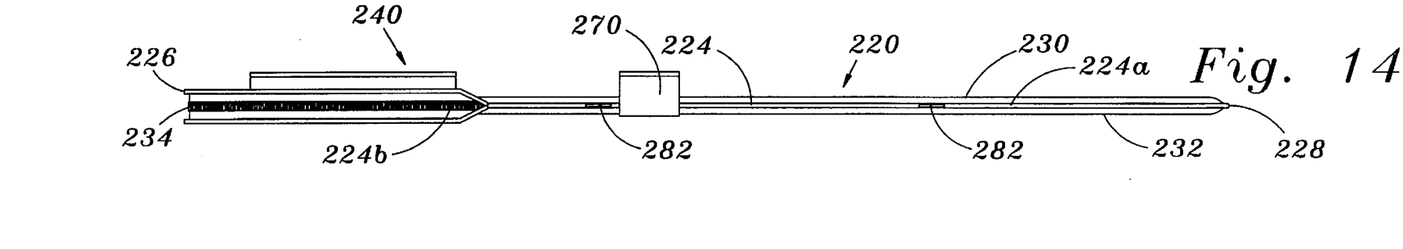
FIG. 14 is a bottom view of the alternate embodiment in a rifle or shotgun transporting position.

FIG. 14 is a bottom view of invention 210. Carrier 220 is shown having bottom edge 224 with lower stepped edge 224a and upper stepped edge 224b, elongated side edge 226 and a short side edge 228, as well as a front panel 230 and a back panel 232. Zipper means 234 is shown openably fastening front panel 230 to back panel 232 at elongated side edge 226.

Integral pocket 240 can be seen attached to front panel 230. Pocket 270 can be seen attached to front panel 230. Pocket 270 can be seen wrapped around carrier 220. "D"-rings 282 are attached to lower stepped edge 224a.

Figure 15:
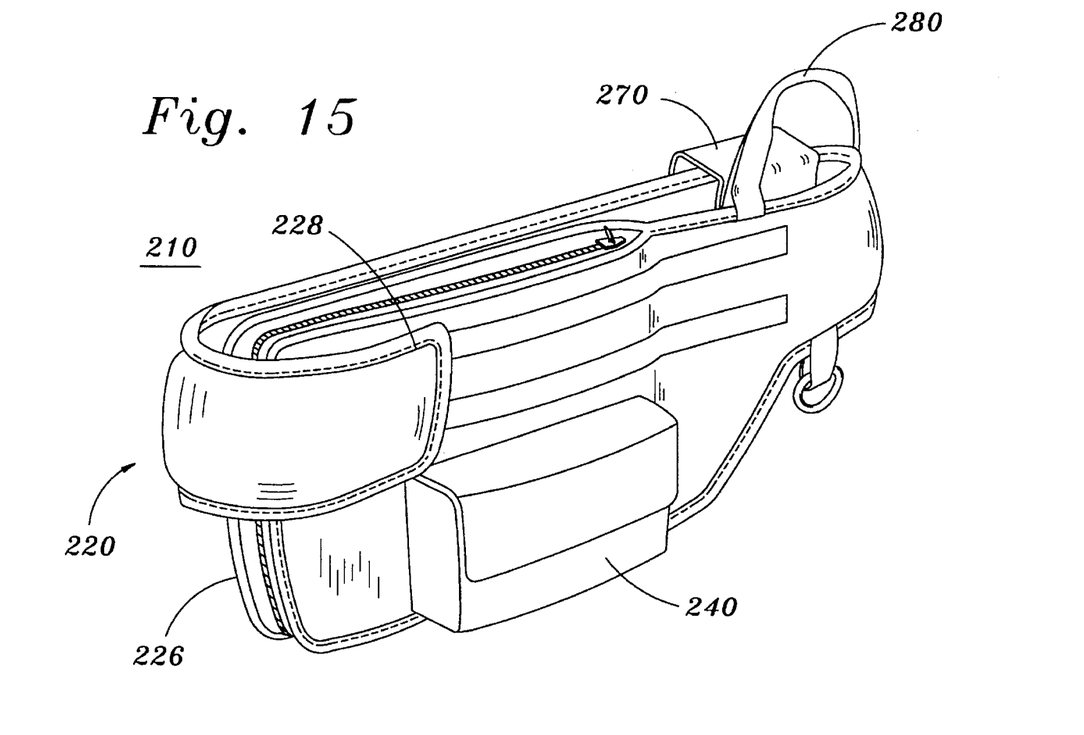
FIG. 15 is a perspective view of the alternate embodiment in a storage position.

FIG. 15 illustrates the present invention 210 in its folded position for storage when not in use. Carrier 220 folds into a compact-sized package which is easily storable when not in use. Further, handle 280 and pockets 240 and 270 remain accessible for easy transportation and storage of accessories.

Figure 16:
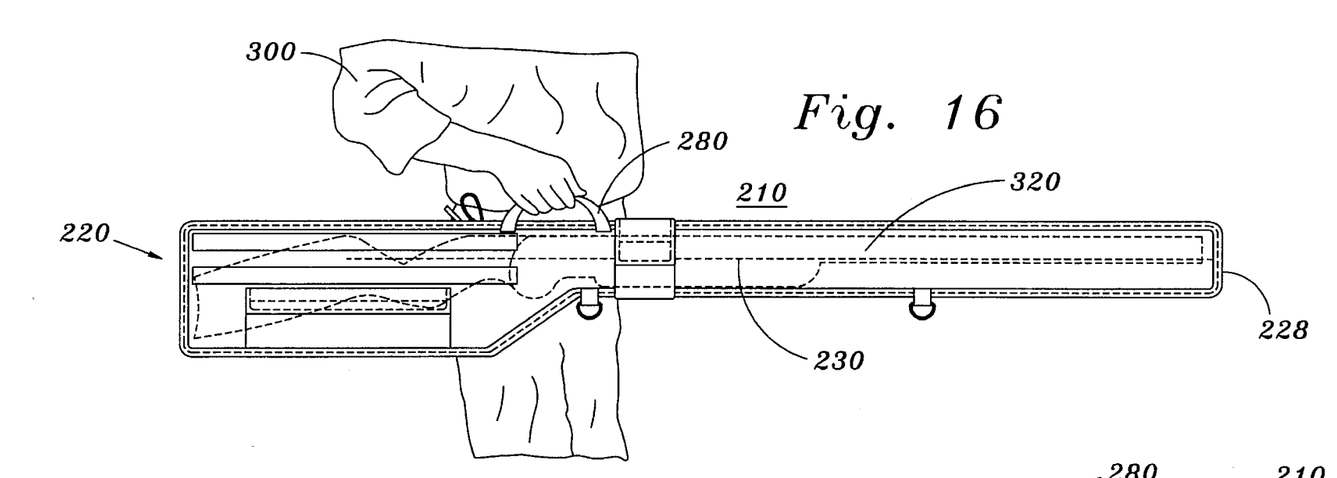
FIG. 16 is a partially broken away front view of the alternate embodiment in use transporting a shotgun.

FIG. 16 is a partially broken away front view of the present invention 210 illustrating short gun 320 inserted into carrier 220. Gun 320 rests securely and safely inside carrier 220. Hunter 300 need only grasp handle 280 and carry invention 210 to a hunting location.

FIG. 17 is a partially broken away front view of the present invention 210 in use in a length adjusted position transporting rifle 320a. As can be seen, rifle 320a is illustrated as being shorter than shotgun 320. Gun 320a rests securely and safely inside carrier 220. In order to prevent the rifle 320a from sliding around inside carrier 220, the present invention 210 is adjustable in carrying length. Short side edge 228 is folded over back panel 232 such that the strips 290a (FIG. 12) selectively and adjustably coact with the two strips 290b (FIG. 12). In this manner, carrier 220 can be adjusted to any length to accommodate any sized elongated gun or firearm. Once adjusted, a hunter need only grasp handle 280 and carry invention 210 to a hunting location. It is foreseen that handle 280 can be selectively and removably fastened by suitable fastening means along the length of top edge 222. Thus, handle 280 can be securely positioned in a desired or optimally balanced position when the carrier is adjusted in length.

FIG. 18 is a top view of the length adjusted carrier 220 of FIG. 17. As can be seen, short side edge 228 is folded over back panel 232 such that fasteners 290 coact. Carrier 220 is adjustable in this manner to any length by selectively positioning edge 228 at any location along back panel 232. All pockets remain accessible.

In use, an elongated firearm 320 is inserted into carrier 220, along with any desired accessories into pockets. Carrier 220 is then adjusted to a desired length, if need be. The user 300 then grasps handle 280 and carries the carrier 220 to a desired hunting location. The padded carrier 220 protects the firearm and accessories from being damaged while in transit. When the user 300 reaches the desired location, the gun 320 is removed and carrier 220 is wrapped around the waist of the user. Short side edge 228 is selectively positioned along fastening material 290a on front panel 230. Fastening material 290a on back panel 232 coacts with fastening material 290 on front panel 230 to securely and comfortably hold the carrier 220 around the waist of the user 300. The user is then free to wander around without restricted movement and hunt, while at the same time having any desired hunting accessories readily at hand.

As described above, pocket 270 is selectably positioned on or removed from carrier 220 according to a user's preference or need. It is foreseen that other pocket options can be made in various shapes or sizes depending on personal preference of a user. For example, an attachable and adjustable pocket similar to pocket 70 could be made for insulated storage for cold items such as a lunch or beverages. Further pockets could be made to hold a large item or to store personal belongings such as glasses, a wallet, a camera, etc.

It is to be understood that the embodiments herein described are merely illustrative of the principles of the present invention. Various modifications may be made by those skilled in the art without departing from the spirit or scope of the claims which follow.

I claim:

1. An elongated recreational device and accessories carrier comprising:

a front panel;

a back panel attached to said front panel at a top edge, a first side edge, a bottom edge and a second side edge, said front and back panel defining an elongated recreational device holding compartment therebetween;

means for selectively opening and closing said device holding compartment disposed on said first side edge;

means for carrying said carrier attached to said top edge;

means for fastening attached to said front panel at said first side edge; and complimentary means for fastening attached to said back panel at said side edge, said carrier selectively usable as a belt, said means for fastening coacting with said complimentary means for fastening when said carrier is used as a belt.

2. A firearm and accessories carrier comprising:

a front panel;

a back panel attached to said front panel at a top edge, a first side edge, a bottom edge and a second side edge, said front and back panel defining a firearm holding compartment therebetween;

means for selectively opening and closing said firearm holding compartment disposed on said first side edge;

means for carrying said carrier attached to said top edge;

means for fastening attached to said front panel at said first said edge; and complimentary means for fastening attached to said back panel at said side edge, said carrier selectively usable as a belt, said means for fastening coacting with said complimentary means for fastening when said carrier is sued as a belt.

3. A carrier for an elongated recreational device comprising a flexible elongated container defined by first and second panels attached to one another and forming at least one elongated compartment therebetween, said container having first and second opposite ends, said container being adaptable to a carrying configuration in which at least one elongated recreational device is contained in said container and a belt configuration in which said container forms an adjustable loop to completely encircle and be worn around a user's waist, means on said container for retaining said container in said loop when said container is in said belt configuration, said means for retaining secured to said front and back panel on at least said first end and said second end, said first end overlapping said second end when said container is in said belt configuration.

4. The carrier of claim 3, further comprising at least one closure means for opening and closing said at least one elongated compartment.

5. The carrier of claim 4, wherein said means for opening and closing is a zipper.

6. The carrier of claim 3, further comprising handle means on said carrier for permitting a user's hand to grip said carrier.

7. The carrier of claim 3, wherein said means for retaining said container in said loop comprises hook-and-loop fasteners.

8. The carrier of claim 3, further comprising a built-in pocket attached to one of said first and said second panels.

9. The carrier of claim 3, further comprising at least one removable and adjustable pocket.

10. The carrier of claim 3, wherein at least one of said first and said second panels is padded.

11. The carrier of claim 3, wherein at least one of said first and said second panels comprises a water-resistant material.

12. The carrier of claim 3, wherein said carrier further comprises foam-lined TRECO and CODURA.

13. The carrier of claim 3, further comprising a built-in knife sheath attached to one of said first and second panels.

14. The carrier of claim 3, for carrying a fishing rod further comprising a built-in fleece for attaching a plurality of fly lures to said carrier.

15. The carrier of claim 3, wherein at least one "D"-ring is attached along the bottom edges of said first and second panels.

16. The carrier of claim 3, wherein at least one clip ring is attached along the bottom edges of said first and second panels.

17. The carrier of claim 3, wherein said panels are divided into two chambers by a stitch line.

18. The carrier of claim 3, wherein said carrier includes means for adjusting length of said carrier to accommodate various length elongated recreational devices.

19. The carrier of claim 3, wherein said container is capable of being folded into a compact package while not in use.

20. The carrier of claim 3, wherein the elongated recreational device is one of a fishing rod, a rifle and a shotgun.

* * * * *